United States Patent [19]
Cao

[11] Patent Number: 6,108,224
[45] Date of Patent: Aug. 22, 2000

[54] PHASE SHIFT TRIGGERING CIRCUIT FOR THYRISTOR AND AN INTEGRATED MODULE OF THE TRIGGERING CIRCUIT AND THE THYRISTOR

[76] Inventor: Jie Cao, No. 106, Guanzhong Road, Linzi, Zibo, China, 255400

[21] Appl. No.: 09/214,449

[22] PCT Filed: Oct. 17, 1996

[86] PCT No.: PCT/CN96/00092

§ 371 Date: Aug. 11, 1999

§ 102(e) Date: Aug. 11, 1999

[87] PCT Pub. No.: WO98/00903

PCT Pub. Date: Jan. 8, 1998

[30] Foreign Application Priority Data

Jul. 2, 1996 [CN] China ................................. 96108462

[51] Int. Cl.[7] .................................................. H02M 5/42
[52] U.S. Cl. ............................................. 363/88; 363/128
[58] Field of Search ................................ 363/34, 37, 41, 363/85, 86, 88, 96, 128, 135, 136

[56] References Cited

U.S. PATENT DOCUMENTS

| 4,315,305 | 2/1982 | Siemon | 363/88 |
| 4,376,968 | 3/1983 | Wueschinski et al. | 363/37 |
| 4,729,082 | 3/1988 | Sato | 363/88 X |

FOREIGN PATENT DOCUMENTS

| 87102014 | 10/1988 | China . |
| 2069632 U | 1/1991 | China . |
| 0 162 944 A1 | 12/1985 | European Pat. Off. . |

*Primary Examiner*—Jessica Han
*Attorney, Agent, or Firm*—Pennie & Edmonds LLP

[57] ABSTRACT

A phase-shift thyristor trigger circuit, including a synchronous signal sampling circuit, a waveform shaping, integrating and comparator circuit, a high-frequency modulating pulse distributor circuit, a power amplification and high frequency pulse rectifier output circuit, characterized in that said synchronous signal sampling circuit includes a transformer, wherein its secondary inductance and a capacitor form a LC resonance circuit for selecting (via transformer coupling) synchronous signal from the main circuit. The trigger circuit connecting with a thyristor main circuit can make up a unified thyristor integrated module. The module is small in size, strong in antiinterference ability, has no requirements for phase sequence and number, and has a broad voltage adaptive range.

13 Claims, 9 Drawing Sheets

PHASE SHIFT TRIGGERING CIRCUIT FOR THYRISTOR AND AN INTEGRATED MODULE OF THE TRIGGERING CIRCUIT AND THE THYRISTOR

FIELD OF THE INVENTION

The invention relates to a thyristor and its trigger circuit, particully to a new type of miniature trigger circuit and a thyristor module integrating the trigger circuit and the thyristor into a whole.

BACKGROUND OF THE INVENTION

The thyristor converter with its advantages of high efficiency, good energy saving effect, fine controlling characteristics and long life, etc., is extensively used in the fields of electric power, metallurgy, machinery, chemical industry and communications, etc., but its development and utilization are far from reaching the desired extent. The main reason is the complexity of the thyristor converter system; in order to set up such a system, work is massive and extremely complicated, and nonprofessional technicians are incompetent for the job. Therefore, its application is greatly obstructed. If the complex system may be simplified to an assembly module, employment of the thyristor will become very simple, and application of thyristor will also be rapidly extended.

The thyristor converter chiefly consists of the two parts: one part is the main circuit system of the thyristor, its mounting and wiring can be achieved according to various needs; another part is the trigger system, i.e., to trigger the gate electrode of the main circuit thyristor via controlled phase angle variation, thereby to control the voltage and current of the main circuit load, and realize the purpose of conversion. For many years, no major variations have occurred in the operational principle of the trigger system, the operational principle of the products currently on sale in the market (such as the products of the Beijing No.2 Semiconductor Devices Factory and the Xi'an Keyi Electronics Co., Ltd.) remains essentially the same as what is taught in the textbook ((Electric Power Electronic Technology)) (Edited by Ding Daohong, Aeronautical Industry Press, June 1992). These conventional trigger systems comprise a synchronous signal sampling circuit, an integrating circuit, a comparator, and an output circuit. Such system is not only difficult to be installed, but also requires that, because of the three-phase balance problem of the synchronous power signal input transformer, Δconnection must be employed, which resulted in that normal work has to be performed on distinguishing phase sequence of the whole system. When any variation in the phase sequence of external power source occurs, the whole system will not be able to operate normally. Since the thyristor may generate or be disturbed by the external interference, and the synchronous signal is achieved by the synchrotrans, while the transformer per se does not possess antiinterference performance, this trigger system is deficient in antiinterference performance too. As the synchrotrans has requirements for rated voltage, consequently the system can only operate at rated voltage and its adaptable range of voltages is narrow. Especially for the trigger circuit of large power silicon controlled rectifier (SCR), its trigger circuit, synchronous sampling transformer and various segmental circuits are very large in size, and inconvenient to use. In addition, the structure of the trigger pulse output circuit is irrational, high in power consumption, big in size, and expensive in cost.

The main circuit and the trigger circuit of the thyristor should be mounted, phased, wired, and adjusted by the user. To achieve this work, the user should also be an experienced technician.

OBJECTIVE OF THE INVENTION

In order to overcome the drawbacks in the use of aforementioned thyristor, an object of the invention is to provide a miniature thyristor trigger circuit. This trigger circuit receives synchronous signals from the main circuit by means of employing Y connection in the primary side of the synchrotrans, a resistor to limit the current and LC resonance frequency selection in the secondary side of the synchrotrans, thus has a micro synchrotrans, thereby remarkably reducing the size of the trigger circuit, enhancing antiinterference ability, and expanding voltage adaptability. Since the trigger circuit adopts high frequency pushpull output mode, the loss is reduced, the cost lowered, and the size further reduced.

Another object of the invention is to offer a thyristor integrated module having the above-mentioned thyristor trigger circuit said module realizes the integration of the synchronous trigger circuit and the thyristor, thus significantly reducing the size and facilitating the operation A further object of the invention is to provide a unified module of a thyristor and its trigger circuit, having the advantages of no phase sequence installation, no phase number limitation, and a wide range of working voltages.

SUMMARY OF THE INVENTION

The thyristor trigger circuit according to the invention, comprises a synchronous signal sampling circuit for receiving sinusoidal synchronous signal from the main circuit; a waveform shaping, integrating and comparator circuit for shaping said sampling signal, generating the sawtooth signal via integrating process, and then forming the rectangular wave phase-shift signal via comparison with the external controlling signal; a high frequency modulating pulse distributor circuit for modulating a 150–400 KC high frequency signal from said rectangular wave phase-shift signal; a power amplification high frequency pulse rectifier output circuit for power amplification and rectification of said modulated high frequency signal to form the trigger signal required by the thyristor. The trigger circuit is characterized in that said synchronous signal sampling circuit receive synchronous signal from the main circuit via transformer coupling and a frequency selective circuit composed in the secondary side of the transformer by LC resonance mode.

The integrated thyristor module having the trigger circuit according to the invention comprises an aforementioned thyristor trigger circuit and a main circuit containing a thyristor, said thyristor of the main circuit can output phase-shift regulating voltage under the action of the trigger signal of the trigger circuit.

The various embodiments of the invention are illustrated in combination with the diagrams as follows.

EMBODIMENT

Figure 4:
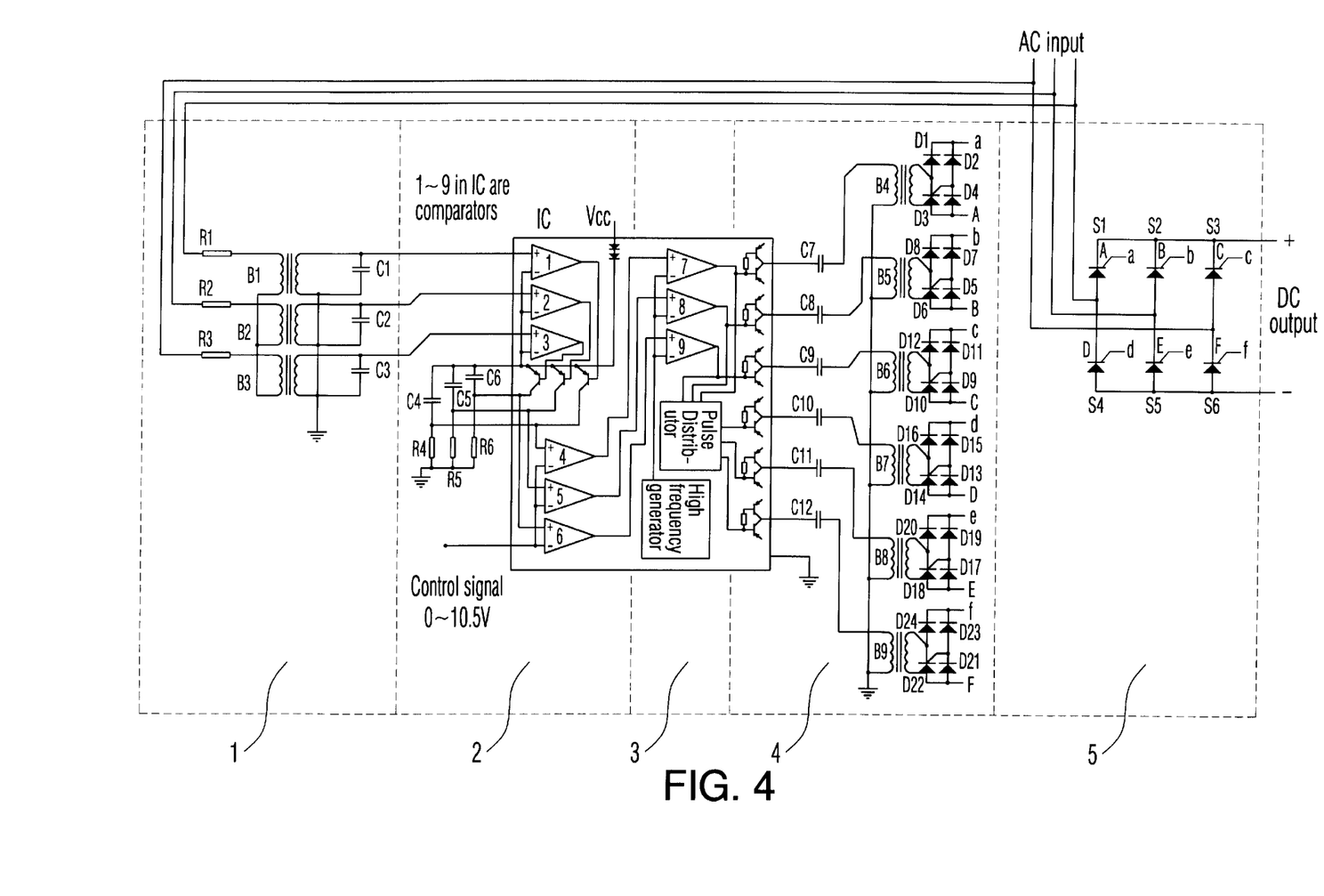
FIG. 4 is a three-phase full-controlled bridge rectifier circuit of the invention.

Referring to FIG. 4, this is a typical embodiment of the invention. The dotted blocks 1–4 in FIG. 4 are the main structures of the thyristor trigger circuit of the invention. Block 1 is the synchronous signal sampling circuit, wherein the AC electric signals of the main circuit being current-limited by the resistors R1, R2, and R3, is input to the primary windings of the transformers B1, B2, and B3. Each of the transformers has the function of isolation, i.e., separating high voltage of the main circuit from the low voltage circuit processing the synchronous signal. The secondary windings of the transformers B1, B2 and B3 compose the resonance circuits respectively with the capacitors Cl, C2, and C3, with the centre frequency of resonance being 50 HZ or 60 HZ (corresponding resonance frequency may be selected according to the AC frequency of the main circuit). Then, a 50 HZ or 60 HZ sinusoidal wave having a certain amplitude will be generated through current-limitation coupling, resonance frequency selection, and filtration. On the secondary winding of the transformer in the synchronous signal circuit of the invention, a LC resonance circuit is particularly employed, which effectively enhances the amplitude of the synchronous signal, filters out the interference clutters, and hence, in comparison with the conventional transformer coupling, the size of the transformer is remarkably reduced; and since a current-limiting resister is provided in the primary winding of the transformer, the transformer size can be further reduced.

The Synchronous signals received from frequency selection enters the waveform shaping, integrating and comparator circuit of block 2, wherein the shaping circuit delivers the synchronous signals via zero crossing comparators 1,2 and 3 for comparison, and then outputs square wave pulses, the square wave pulses being carried to the periodical integrating circuits (C4, R4, C5, R5 and C6, R6) respectively, generate saw tooth wave signals originating from the trailing edges, the signals, after being compared with the control signals from the control terminal in the comparators 4,5, and 6, generate the rectangular wave phase-shift signals. The rectangular wave phase-shift signal is delivered to the high-frequency modulation and pulse distributor circuit of block 3 and modulated to a 150–400 KC high frequency signal, wherein said pulse distributor is designed for adapting triggering of the three-phase full controlled bridge rectifier circuit or the three-phase full-controlled AC voltage regulator circuit, and triggering of various types of two-phase and single-phase full-controlled circuit. The modulated high frequency signal is delivered to power amplification and high frequency pulse rectifier output circuit 4 for power amplification. In the diagram, push-pull power amplification is employed, other forms of power amplification may also be used, providing that they meet the triggering power required by the thyristor gate electrode. The power amplificated signal is output through the transformer isolation coupling, rectified by a rectifier circuit (a bridge rectifier is adopted in the diagram, other rectifier may also be used), and carried to the corresponding thyristor gate electrode for triggering.

By foregoing description, it can be seen that:
(1) The synchronous signal circuit of the trigger circuit according to the invention has the functions of current limiting, frequency selection and filtering, as well as good antiinterference performance., and has reliable stability and a very small size.
(2) The secondary side of said synchronous signal circuit employs LC resonance circuit; when the main circuit voltage lowers, the amplitude of the extracted synchronous signal is still large enough to meet the operation requirement of zero crossing comparator. Hence, the trigger circuit of the invention has a broader adaptive range of the main circuit voltages.
(3) Since the synchronous signal complies with the phase of the main circuit voltage, there is no phase sequence problem, consequently the three-phase module may be directly used in a two-phase or single-phase circuit.
(4) The output stage of the trigger circuit adopts the push-pull output mode, and the trigger pulse frequency is raised to 150–400 KC, thereby reducing the size of the output stage.

Figure 9A:
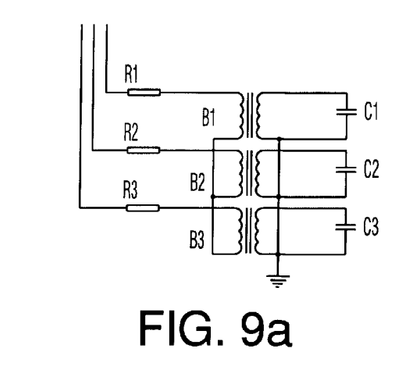
FIG. 9a is the basic circuit of the synchronous sampling signal serving as the characteristic of the invention
Figure 9B:
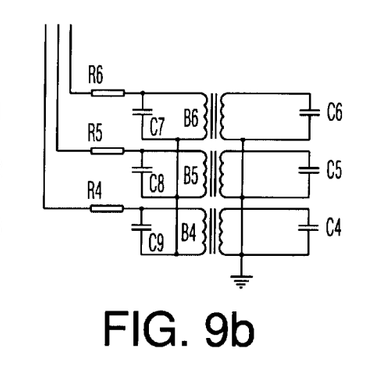
FIGS. 9b–g are its modifications, which can also generate synchronous signals.
Figure 9C:
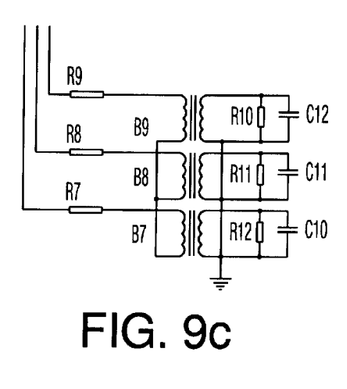
Figure 9D:
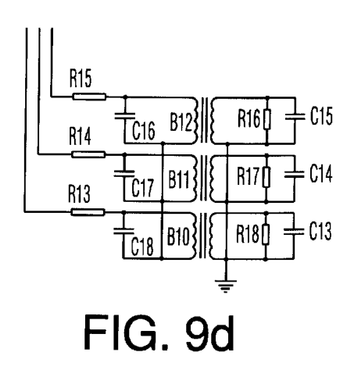
Figure 9E:
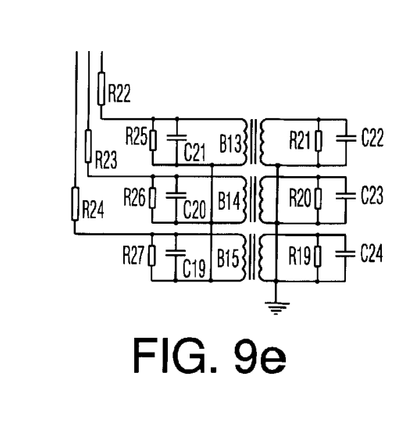
Figure 9F:
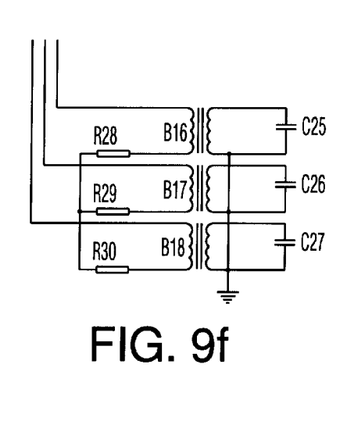
Figure 9G:
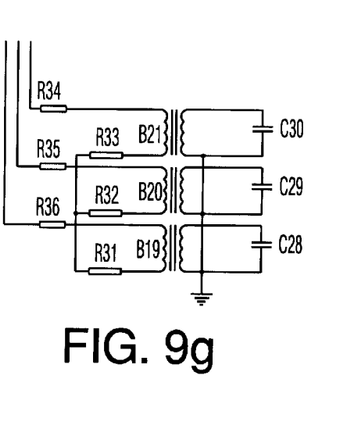

According to the basic circuit of the synchronous signal circuit of the trigger circuit of the invention as shown in FIG. 9a, the circuit can have many modifications. FIGS. 9b–g illustrate the examples of several modifications. In FIG. 9b, the primary inductance of the transformer is in parallel connection with a capacitor to form resonance having the function of initial selection of the synchronous signals. In FIG. 9c, a resistor is connected in parallel in the LC oscillation circuit of the transformer secondary winding for clutter interference signal attenuation. FIG. 9d is the combination of FIG. 9b and FIG. 9c. In FIG. 9e, a resistor in parallel connection is added on the primary winding of the transformer based on FIG. 9d. In FIG. 9f, a current-limiting resistor is disposed on the output terminal of the transformer primary winding. In FIG. 9g, current-limiting resistor are provided on both terminals of the transformer primary winding respectively, all the various synchronous signal circuit shown in FIG. 9a–g can receive synchronous signals normally.

In FIG. 4, block 5 illustrates an embodiment in the main circuit of the thyristor converter, which is a three-phase full-controlled bridge rectifier circuit. According to the invention, since the trigger circuit has small size, strong antiinterference ability and no requirement for phase sequence, the trigger circuit and the main circuit can be combined into a whole and comprised in a module. For a SCR having a rated current of 75A, the typical dimensions of the combined module are 95×55×35 mm$^3$ approximately.

Figure 1:
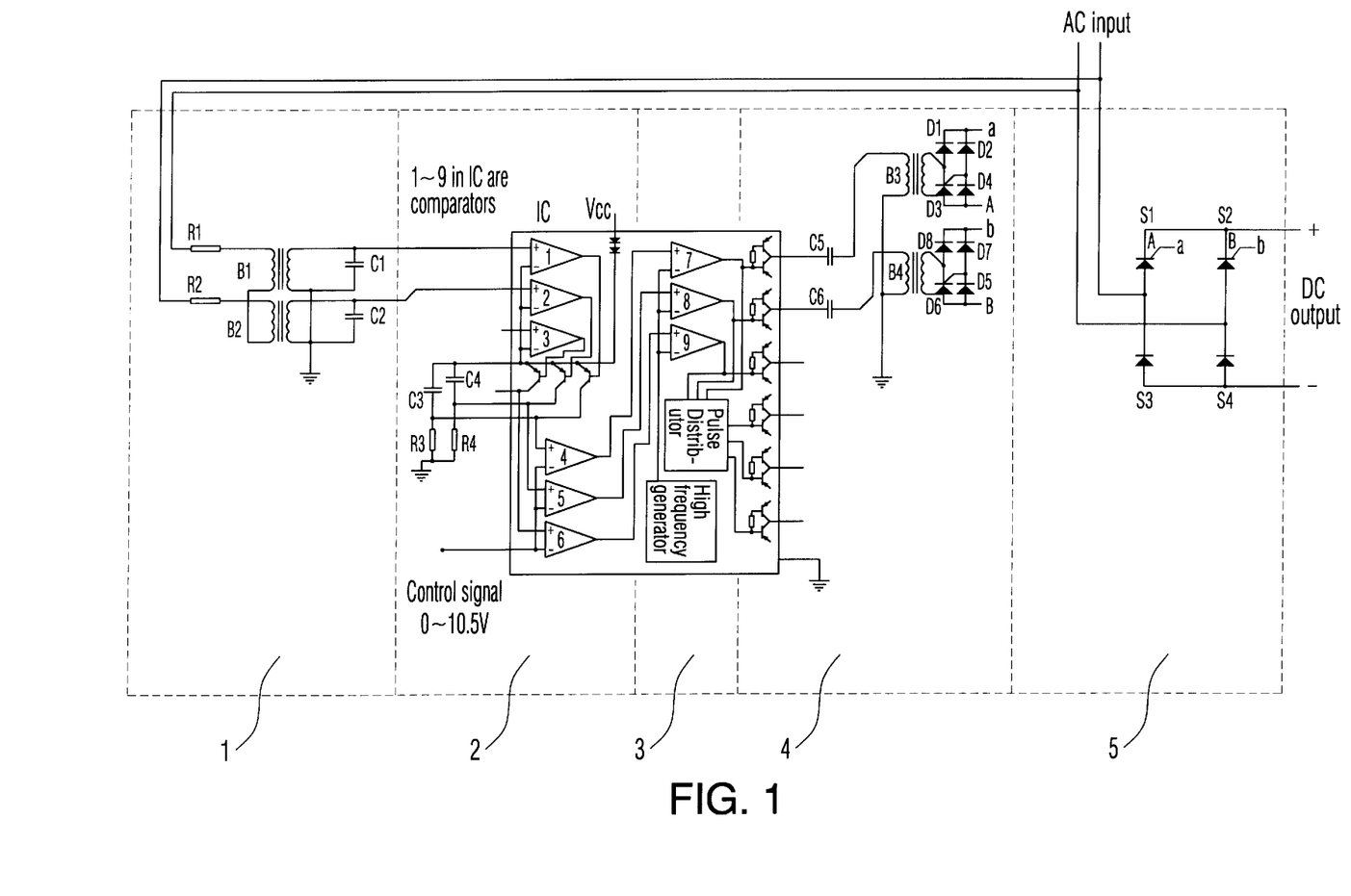
FIG. 1 is a single-phase half-controlled bridge rectifier circuit of the invention.
Figure 2:
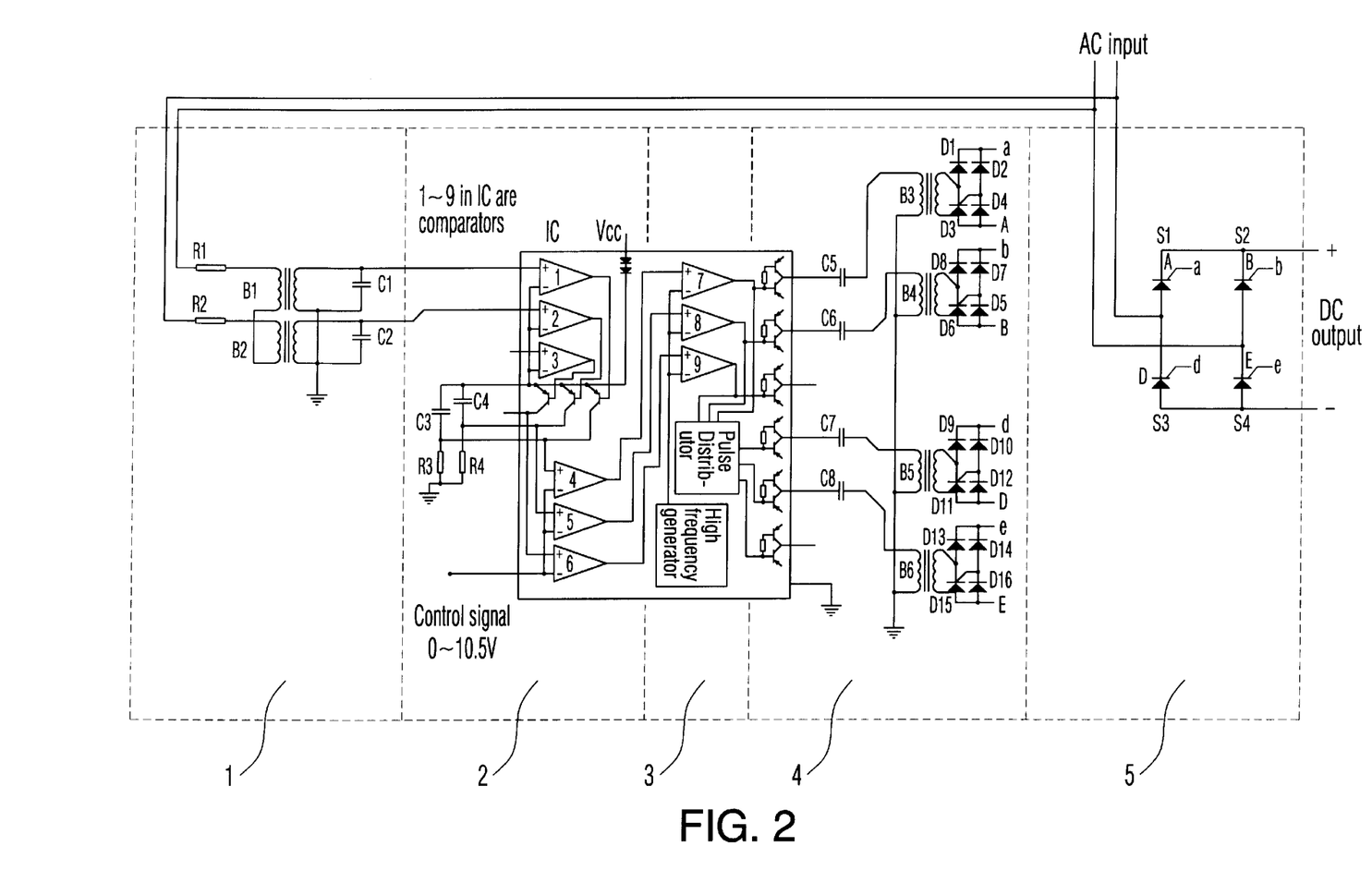
FIG. 2 is a single-phase full-controlled bridge rectifier circuit of the invention.
Figure 3:
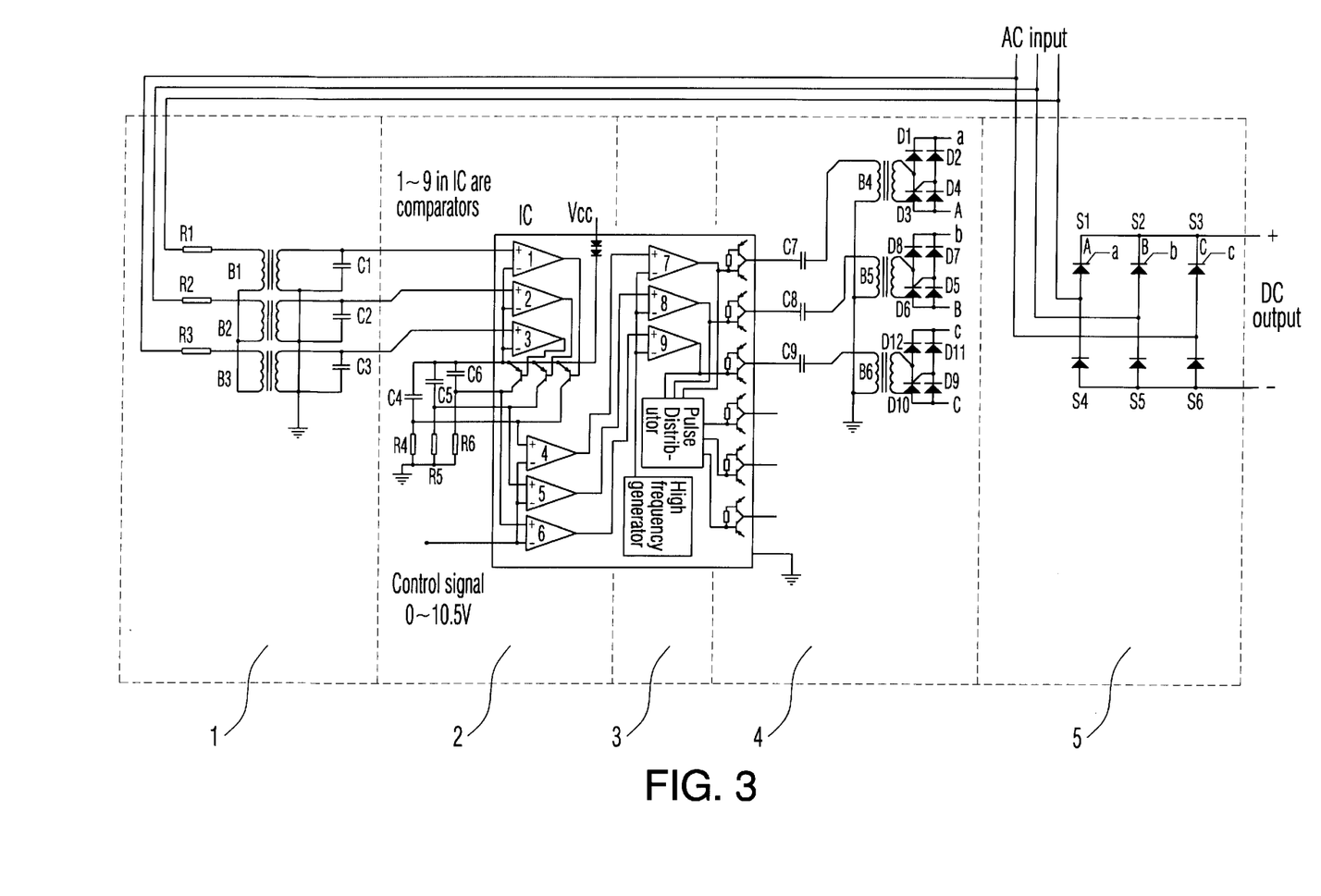
FIG. 3 is a three-phase half-controlled bridge rectifier circuit of the invention.

FIG. 2 is a diagram of the combined module circuit of a single-phase half-controlled bridge rectifier circuit of the invention; the difference between FIG. 2 and FIG. 4 lies in that all the various parts in the former diagram work in single phase. FIG. 3 is a three-phase half-controlled bridge rectifier circuit of the invention; the difference between FIG. 3 and FIG. 4 lies in that the main circuit of the former diagram is a half-controlled bridge rectifier circuit, and only half-controlled signal is output at the power amplification stage 4. FIG. 1 is a single-phase half-controlled bridge rectifier circuit; which is different from FIG. 2 in that only half-controlled signal is output at the power amplification stage 4.

Figure 5:
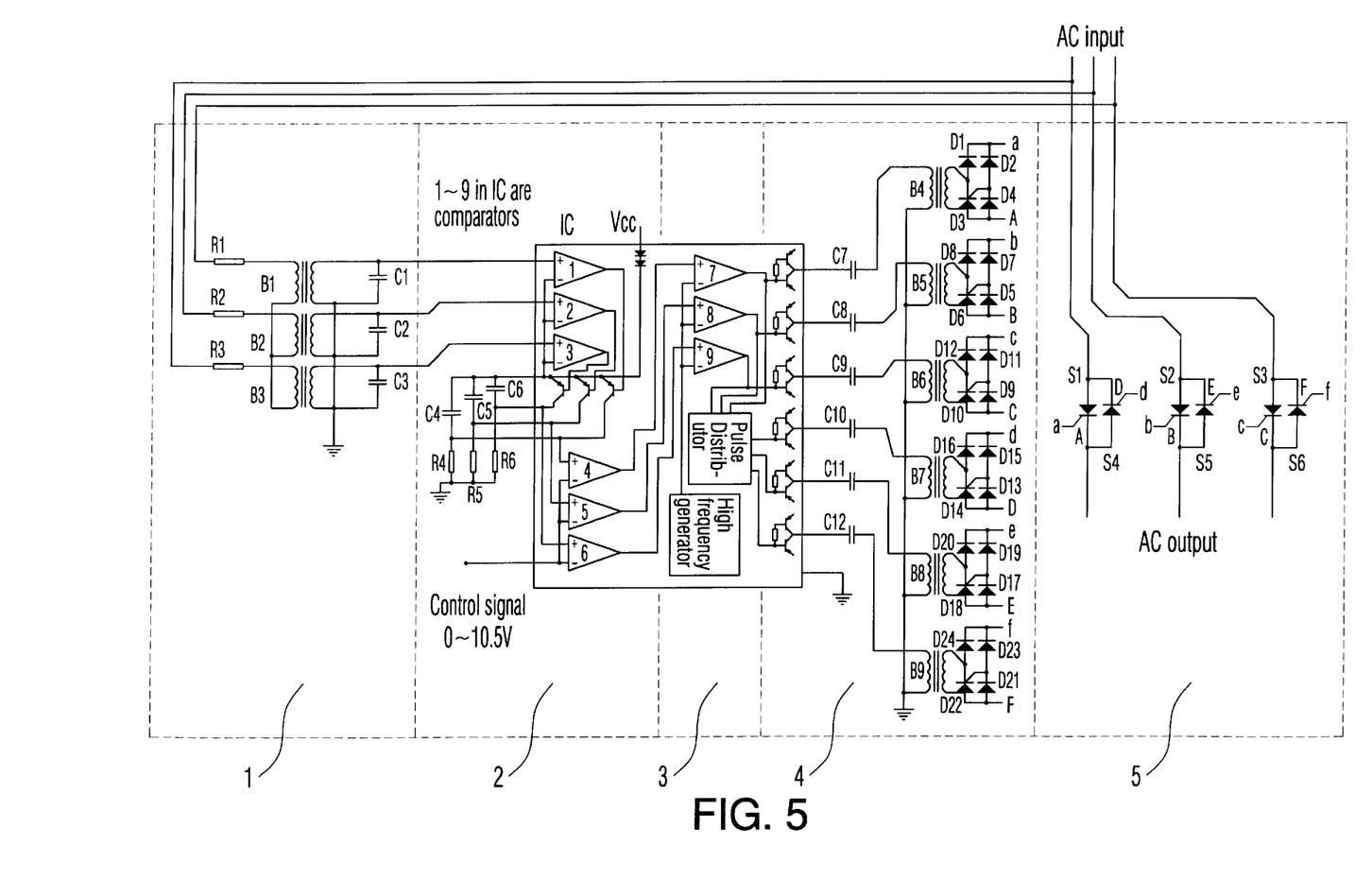
FIG. 5 is a three-phase full-controlled AC voltage regulator circuit of the invention.
Figure 6:
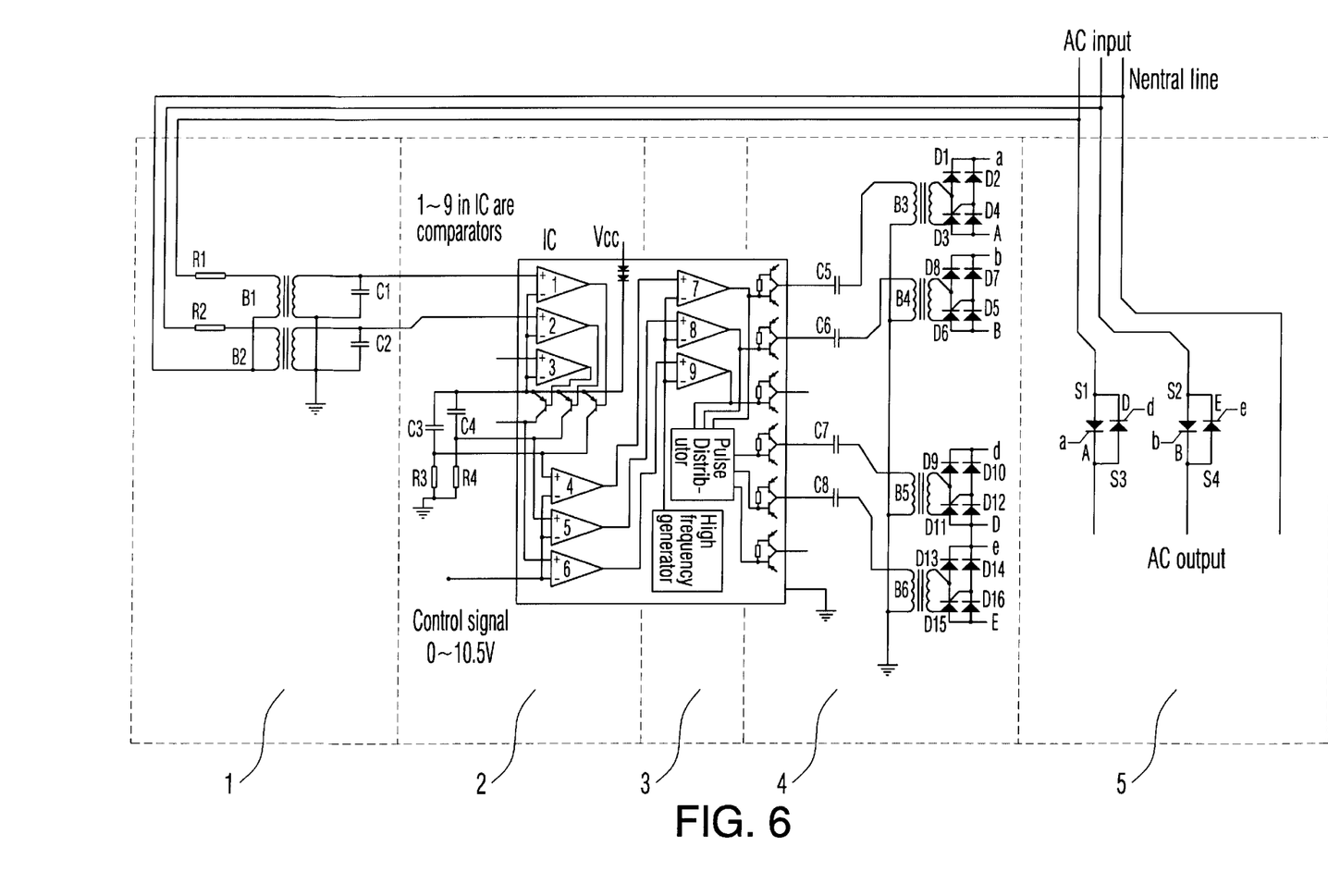
FIG. 6 is a two-phase zero-type full-controlled AC voltage regulator circuit of the invention.
Figure 7:
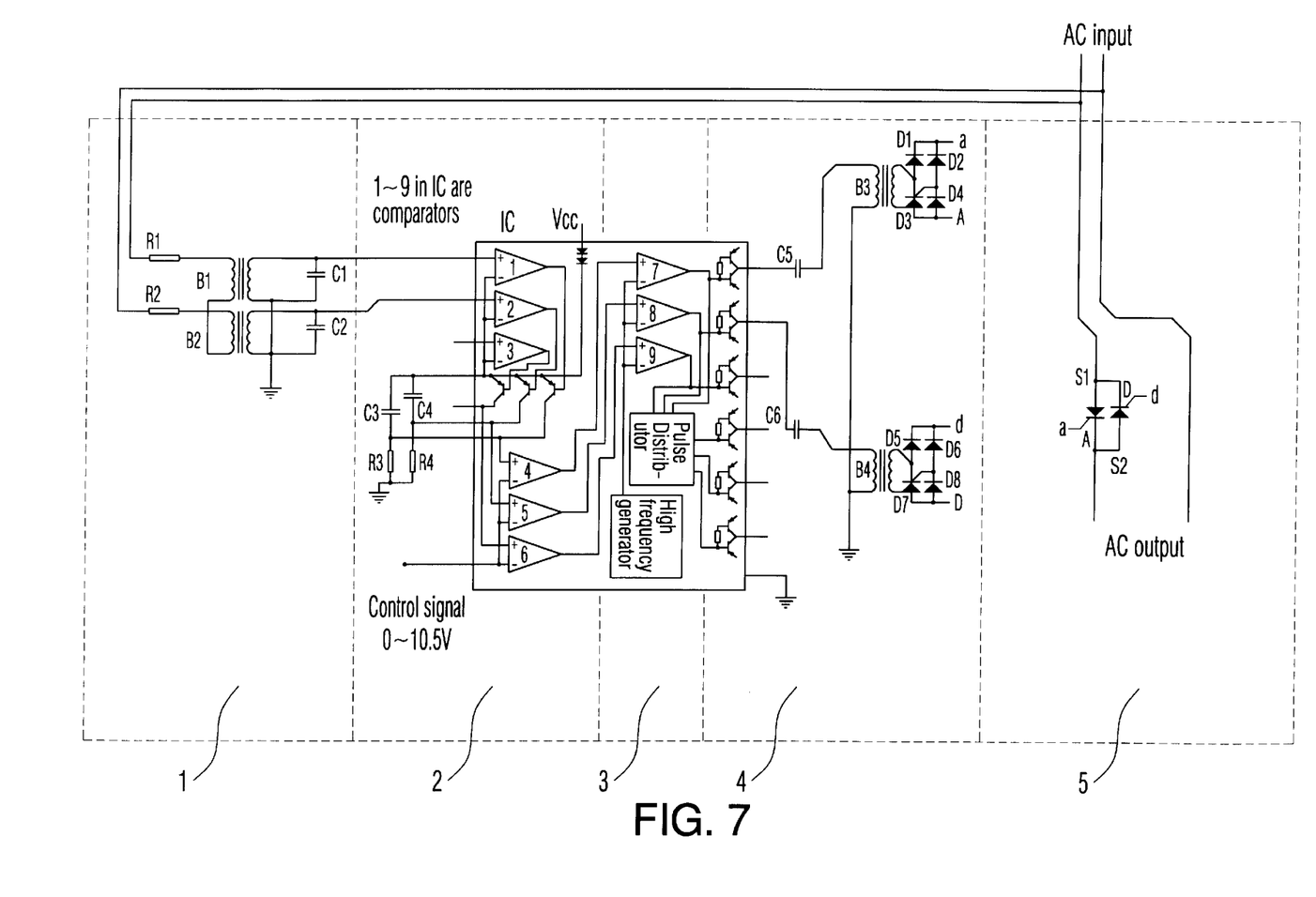
FIG. 7 is a single-phase full-controlled AC voltage regulator circuit of the invention.
Figure 8:
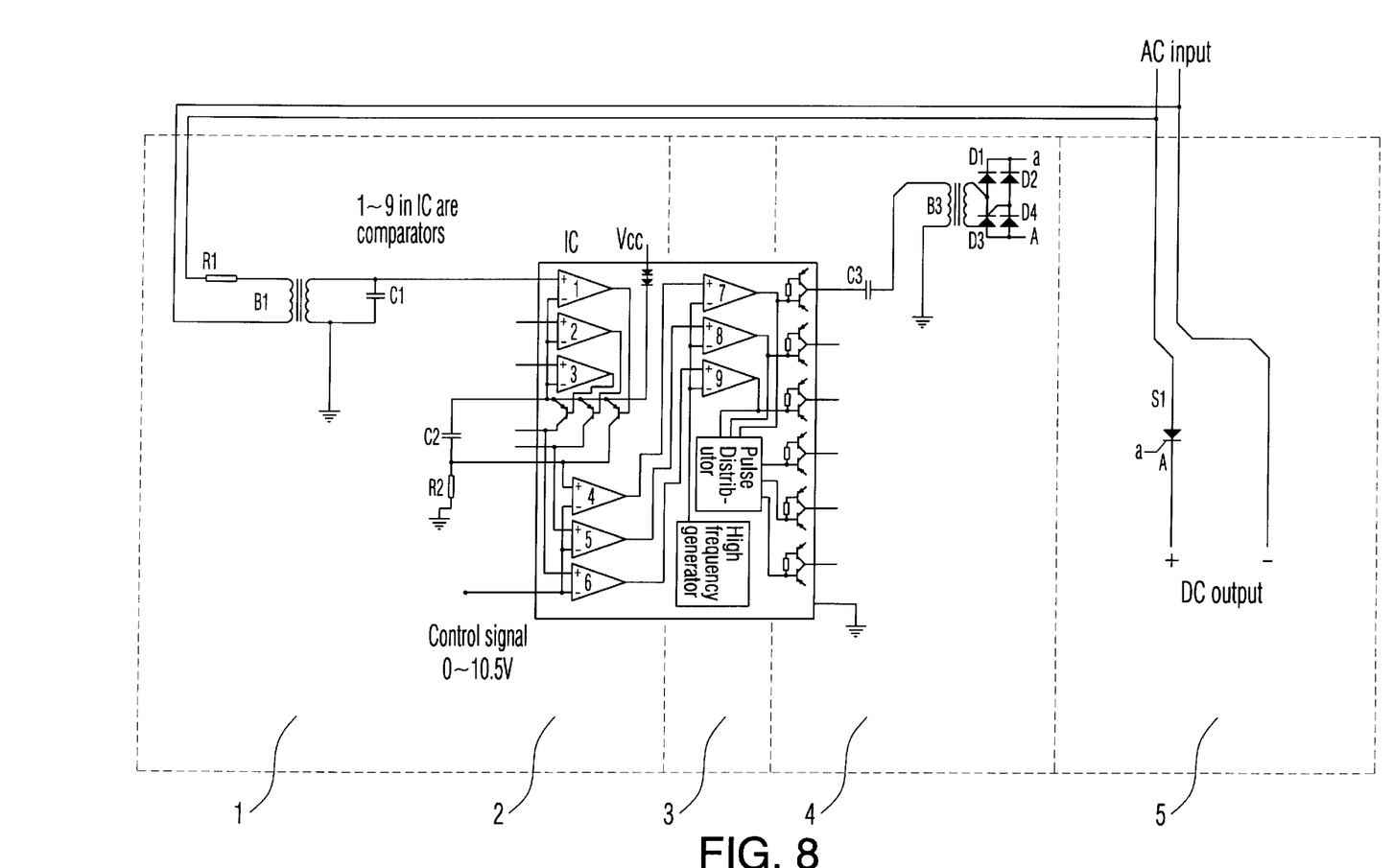
FIG. 8 is a single-phase half-wave controlled rectifier circuit of the invention.

FIG. 5 is a three-phase full-controlled AC voltage regulator circuit of the invention; FIG. 6 is a two-phase zero-type full-controlled AC voltage regulator circuit of the invention; FIG. 7 is a single-phase full-controlled AC voltage regulator circuit of the invention; FIG. 8 is a single-phase half wave controlled rectifier circuit. All of them adopt essentially similar trigger circuits of the invention, only slightly different according to variations in main circuit SCR connection.

What is claimed is:

1. A thyristor phase-shift trigger circuit, comprising a synchronous signal sampling circuit for receiving synchronous signal from a main circuit; a waveform shaping, integrating and comparator circuit for processing said received synchronous signal to generate a rectangular wave phase-shift signal; a high frequency modulation pulse distributor circuit for modulating said rectangular wave phase-shift signal to a high-frequency signal; a power-amplification and high-frequency pulse rectifier output circuit for conducting power amplification and rectification of said modulated high frequency signal, and forming the triggering signal required by the thyristor, characterized in that, said synchronous signal sampling circuit comprises a transformer, wherein its primary winding is connected with the main circuit, its secondary winding and a capacitor compose a LC resonance circuit for selecting synchronous signal from the main circuit.

2. A thyristor phase-shift trigger circuit according to claim 1, wherein a current-limiting resistor is connected in series between the primary winding of the transformer of said synchronous signal sampling circuit and the main circuit.

3. A thyristor phase-shift trigger circuit according to claim 1, wherein said high-frequency modulation pulse distributor circuit modulates the rectangular wave phase-shift signal, coming from said integrating and comparator circuit, to a 150–400 KC high-frequency signal.

4. A thyristor phase-shift trigger circuit according to claim 1, wherein said power-amplification circuit employs push-pull power amplification output.

5. A thyristor integrated module of a trigger circuit using the thyristor phase-shift trigger circuit according to claim 1, wherein a thyristor main circuit is comprised.

6. A thyristor integrated module according to claim 5 having the trigger circuit, wherein said thyristor main circuit is so connected as forming a three-phase full-controlled bridge rectifier circuit.

7. A thyristor integrated module according to claim 5 having the trigger circuit, wherein said thyristor main circuit is so connected as forming a three-phase half-controlled bridge rectifier circuit.

8. A thyristor integrated module according to claim 5 having the trigger circuit, wherein said thyristor main circuit is so connected as forming a single-phase full-controlled bridge rectifier circuit.

9. A thyristor integrated module according to claim 5 having the trigger circuit, wherein said thyristor main circuit is so connected as forming a single-phase half-controlled bridge rectifier circuit.

10. A thyristor integrated module according to claim 5 having the trigger circuit wherein said thyristor main circuit is so connected as forming a three-phase full-controlled AC voltage regulator circuit.

11. The thyristor integrated module according to claim 5 having the trigger circuit, wherein said thyristor main circuit is so connected as forming a two-phase zero type full-controlled AC voltage regulator circuit.

12. The thyristor integrated module according to claim 5 having the trigger circuit, wherein said thyristor main circuit is so connected as forming a single-phase full-controlled AC voltage regulator circuit.

13. The thyristor integrated module according to claim 5 having the trigger circuit, wherein said thyristor main circuit is so connected as forming a single-phase half wave controlled rectifier circuit.

* * * * *